United States Patent
Umeda et al.

(10) Patent No.: US 11,956,764 B2
(45) Date of Patent: Apr. 9, 2024

(54) CARRIER AGGREGATION CONFIGURATION IN 5G WIRELESS NETWORKS

(71) Applicant: Nokia Technologies OY, Espoo (FI)

(72) Inventors: Hiromasa Umeda, Kanagawa (JP); Petri J. Vasenkari, Turku (FI); Amaanat Ali, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 261 days.

(21) Appl. No.: 17/504,666

(22) Filed: Oct. 19, 2021

(65) Prior Publication Data

US 2022/0132503 A1 Apr. 28, 2022

Related U.S. Application Data

(60) Provisional application No. 63/104,066, filed on Oct. 22, 2020.

(51) Int. Cl.
*H04W 72/0453* (2023.01)
*H04L 5/00* (2006.01)
*H04W 72/51* (2023.01)

(52) U.S. Cl.
CPC ....... *H04W 72/0453* (2013.01); *H04L 5/0053* (2013.01); *H04L 5/0092* (2013.01); *H04W 72/51* (2023.01)

(58) Field of Classification Search
CPC ............. H04W 72/04; H04W 72/0453; H04W 72/20–23; H04W 72/50–51;

(Continued)

(56) References Cited

U.S. PATENT DOCUMENTS 10,582,377 B2 * 3/2020 Takahashi ............. H04L 5/0092
10,757,566 B2 * 8/2020 He ......................... H04W 8/24
(Continued)

FOREIGN PATENT DOCUMENTS

EP 3 621 368 A1 3/2020

OTHER PUBLICATIONS

"3rd Generation Partnership Project; Technical Specification Group Radio Access Network; NR;User Equipment (UE) radio transmission and reception;Part 1: Range 1 Standalone," 3GPP TS 38.101-1 V17.3.0, Sep. 2021.

(Continued)

*Primary Examiner* — Brendan Y Higa
(74) *Attorney, Agent, or Firm* — ALSTON & BIRD LLP

(57) ABSTRACT

A radio access network element includes at least one processor and at least one memory including computer program code. The at least one memory and the computer program code configured to, with the at least one processor, cause the radio access network element to: generate a carrier aggregation configuration for a user equipment based on capability information from the user equipment, the capability information including at least supported maximum channel bandwidth information and supported minimum channel bandwidth information for each band within a band combination; and send the carrier aggregation configuration to the user equipment to configure the user equipment for communication with the radio access network element.

24 Claims, 6 Drawing Sheets

(58) Field of Classification Search
CPC ........... H04W 76/00–50; H04L 5/0053; H04L 5/0091–0098
See application file for complete search history.

(56) References Cited

U.S. PATENT DOCUMENTS

| | | | |
|---|---|---|---|
| 10,904,789 B2* | 1/2021 | Balasubramanian | ........................ H04W 36/0022 |
| 2011/0205976 A1* | 8/2011 | Roessel | ................ H04L 5/0096 370/329 |
| 2013/0242911 A1* | 9/2013 | Heo | .................... H04W 52/367 370/329 |
| 2016/0262053 A1* | 9/2016 | Palm | ..................... H04W 48/16 |
| 2017/0367073 A1* | 12/2017 | Murugan | ................. H04L 5/001 |
| 2019/0253925 A1* | 8/2019 | Gholmieh | .............. H04B 1/005 |
| 2019/0306925 A1* | 10/2019 | Iskander | ................. H04W 8/24 |
| 2019/0357199 A1* | 11/2019 | Ali | ........................... H04L 5/001 |
| 2020/0036438 A1* | 1/2020 | Kim | ...................... H04B 7/0669 |
| 2020/0053811 A1 | 2/2020 | Ang et al. | |
| 2020/0221290 A1* | 7/2020 | Wiemann | ................. H04W 8/24 |
| 2020/0260265 A1* | 8/2020 | Jin | .......................... H04W 8/24 |
| 2020/0336889 A1* | 10/2020 | Liang | ...................... H04W 8/24 |
| 2020/0351643 A1* | 11/2020 | Dhanapal | ............. H04B 7/0413 |
| 2020/0351834 A1* | 11/2020 | Gholmieh | ............... H04L 5/001 |
| 2021/0022149 A1* | 1/2021 | Saber | .................... H04L 5/0055 |
| 2021/0204113 A1* | 7/2021 | Jia | ........................ H04W 72/0453 |
| 2021/0243751 A1* | 8/2021 | Saber | ..................... H04L 5/0091 |
| 2021/0337378 A1* | 10/2021 | Hosseini | ................. H04L 5/001 |
| 2022/0182816 A1* | 6/2022 | Kuang | .............. H04W 72/0453 |
| 2022/0303975 A1* | 9/2022 | Ma | ..................... H04W 72/0453 |
| 2022/0338188 A1* | 10/2022 | Jain | ................... H04W 72/0453 |
| 2022/0360974 A1* | 11/2022 | Palle Venkata | ....... H04W 24/02 |
| 2023/0163823 A1* | 5/2023 | Matsumura | ........... H04L 5/0094 370/329 |
| 2023/0337202 A1* | 10/2023 | Pant | ...................... H04L 5/0053 |

OTHER PUBLICATIONS

"3rd Generation Partnership Project; Technical Specification Group Radio Access Network;NR;Requirements on User Equipments (Ues) supporting a release-independent frequency band," 3GPP TS 38.307 V17.3.0,Sep. 2021.

"3rd Generation Partnership Project; Technical Specification Group Radio Access Network; NR;User Equipment (UE) radio access capabilities," 3GPP TS 38.306 V16.6.0,Sep. 2021.

3rd Generation Partnership Project;Technical Specification Group Radio Access Network; NR;Radio Resource Control (RRC) protocol specification, 3GPP TS 38.331 V16.6.0,Sep. 2021.

T-Mobile USA, et al., "An alternative to creating new BCSs," 3GPP TSG-RAN WG4 Meeting #96-e, R4-20100623, Electronic Meeting, Aug. 17-28, 2020.

Examination Report for Australian Application No. 2021366173 dated Dec. 22, 2023, 3 pages.

Qualcomm Incorporated, "UE Capability for Maximum Channel Bandwidth", 3GPP TSG-RAN WG2 Meeting #102, R2-1809039, (May 21-25, 2018), 6 pages.

* cited by examiner

| LTE CA Configuration | LTE Bands | Channel Bandwidth (MHz) | | | | | | BCS |
|---|---|---|---|---|---|---|---|---|
| | | 1.4 | 3 | 5 | 10 | 15 | 20 | |
| CA_4A-12A | 4 | Y | Y | Y | Y | | | 0 |
| | 12 | | | Y | Y | | | |
| | 4 | Y | Y | Y | Y | | Y | 1 |
| | 12 | | | Y | Y | | | |
| | 4 | | Y | Y | Y | Y | Y | 2 |
| | 12 | | | Y | Y | | | |
| | 4 | | | Y | Y | Y | | 3 |
| | 12 | | | Y | Y | | | |
| | 4 | | | Y | Y | Y | Y | 4 |
| | 12 | | | Y | Y | Y | | |
| | 4 | | | Y | Y | | | 5 |
| | 12 | | | Y | | | | |

FIG. 4

| NR CA CONFIGURATION | NR BAND | SCS (kHz) | CHANNEL BANDWIDTH (MHz) | | | | | | | | | | | | | BCS |
|---|---|---|---|---|---|---|---|---|---|---|---|---|---|---|---|---|
| | | | 5 | 10 | 15 | 20 | 25 | 30 | 40 | 50 | 60 | 70 | 80 | 90 | 100 | |
| CA_n28A-n75A | n28 | 15 | Y | Y | Y | Y | | | | | | | | | | 0 |
| | | 30 | | Y | Y | Y | | | | | | | | | | |
| | | 60 | | | | | | | | | | | | | | |
| | n75 | 15 | Y | Y | Y | Y | | | | | | | | | | |
| | | 30 | | Y | Y | Y | | | | | | | | | | |
| | | 60 | | Y | Y | Y | | | | | | | | | | |
| | n28 | 15 | Y | Y | Y | Y | Y | | | | | | | | | 1 |
| | | 30 | | Y | Y | Y | Y | Y | Y | Y | | | | | | |
| | | 60 | | Y | Y | Y | Y | Y | Y | Y | | | | | | |
| | n75 | 15 | Y | Y | Y | Y | Y | | | | | | | | | |
| | | 30 | | Y | Y | Y | Y | Y | Y | Y | | | | | | |
| | | 60 | | Y | Y | Y | Y | Y | Y | Y | | | | | | |

FIG. 5

| NR CA CONFIGURATION | NR BAND | SCS (kHz) | CHANNEL BANDWIDTH (MHz) | | | | | | | | | | | BCS |
|---|---|---|---|---|---|---|---|---|---|---|---|---|---|---|
| | | | 5 | 10 | 15 | 20 | 25 | 30 | 40 | 50 | 60 | 70 | 80 | 90 | 100 | |
| | n28 | 15 | * | Y | Y | Y | | | | | | | | | | |
| | | 30 | | Y | Y | Y | | | | | | | | | | |
| | | 60 | | | | | | | | | | | | | |
| | n75 | 15 | * | * | * | Y | Y | Y | Y | | | | | | | EXAMPLE BCS2 |
| | | 30 | | * | * | Y | Y | Y | Y | | | | | | | |
| | | 60 | | * | * | Y | Y | Y | Y | | | | | | | |

FIG. 6

CARRIER AGGREGATION CONFIGURATION IN 5G WIRELESS NETWORKS

CROSS-REFERENCE TO RELATED APPLICATION(S)

This application claims priority under 35 U.S.C. § 119(e) to U.S. Provisional Application No. 63/104,066, filed on Oct. 22, 2020, the entire contents of which are incorporated herein by reference.

TECHNICAL FIELD

One or more example embodiments relate to wireless communications networks.

BACKGROUND

Fifth generation (5G) wireless communications networks are the next generation of mobile communications networks. Standards for 5G communications networks are currently being developed by the 3rd Generation Partnership Project (3GPP). These standards are known as 3GPP New Radio (NR) standards.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

One or more example embodiments provide mechanisms that may alleviate the need to add bandwidth combination sets (BCSs) and/or reduce the number of updates required for the gNB in a 3rd Generation Partnership Project (3GPP) New Radio (NR) network.

One or more example embodiments may alleviate the need to update existing NR CA BCS tables in 3GPP Radio Access Network Working Group 4 (RAN4) specifications and/or may alleviate the need for the gNB to import these tables to software.

One or more example embodiments also reduce the need to report redundant information to the gNB, thereby decreasing signaling overhead and/or improving bandwidth capacity.

At least one example embodiment provides a radio access network element comprising at least one processor and at least one memory including computer program code. The at least one memory and the computer program code are configured to, with the at least one processor, cause the radio access network element to: generate a carrier aggregation configuration for a user equipment based on capability information from the user equipment, the capability information including at least supported maximum channel bandwidth information and supported minimum channel bandwidth information for each band within a band combination; and send the carrier aggregation configuration to the user equipment to configure the user equipment for communication with the radio access network element.

At least one other example embodiment provides a radio access network element comprising: means for generating a carrier aggregation configuration for a user equipment based on capability information from the user equipment, the capability information including at least supported maximum channel bandwidth information and supported minimum channel bandwidth information per sub-carrier spacing for each band within a band combination; and means for sending the carrier aggregation configuration to the user equipment to configure the user equipment for communication with a radio access network element.

At least one other example embodiment provides a method comprising: generating a carrier aggregation configuration for a user equipment based on capability information from the user equipment, the capability information including at least supported maximum channel bandwidth information and supported minimum channel bandwidth information per sub-carrier spacing for each band within a band combination; and sending the carrier aggregation configuration to the user equipment to configure the user equipment for communication with a radio access network element.

At least one other example embodiment provides a non-transitory computer readable medium storing computer readable instructions that, when executed by at least one processor at a radio access network element, cause the radio access network element to perform a method comprising: generating a carrier aggregation configuration for a user equipment based on capability information from the user equipment, the capability information including at least supported maximum channel bandwidth information and supported minimum channel bandwidth information per sub-carrier spacing for each band within a band combination; and sending the carrier aggregation configuration to the user equipment to configure the user equipment for communication with a radio access network element.

According to at least some example embodiments, the at least one memory and the computer program code may be configured to, with the at least one processor, cause the radio access network element to generate the carrier aggregation configuration without storing definitions of each bandwidth combination set supported by the user equipment.

The supported maximum channel bandwidth information may include a supported maximum channel bandwidth per sub-carrier spacing for each band within the band combination.

The supported minimum channel bandwidth information may include a supported minimum channel bandwidth per sub-carrier spacing for each band within the band combination.

The user equipment may support a subset of all specified channel bandwidths per sub-carrier spacing for each band as a single band operation, and the capability information may include an indication of channel bandwidths in the subset of all specified channel bandwidths per sub-carrier spacing for each band as the single band operation.

The at least one memory and the computer program code may be configured to, with the at least one processor, cause the radio access network element to send a capability inquiry requesting the capability information from the user equipment.

The capability information may include an indication that the capability information includes information to identify supported channel bandwidths for each band within the band combination.

The at least one memory and the computer program code may be configured to, with the at least one processor, cause the radio access network element to send the carrier aggregation configuration to the user equipment as a Radio Resource Control message.

The band combination may include at least a first New Radio band and a second New Radio band, the supported maximum channel bandwidth information may include (i) a first supported maximum channel bandwidth per sub-carrier spacing for the first New Radio band and (ii) a second supported maximum channel bandwidth per sub-carrier spacing for the second New Radio band, and the supported minimum channel bandwidth information may include (i) a first supported minimum channel bandwidth per sub-carrier spacing for the first New Radio band and (ii) a second supported minimum channel bandwidth per sub-carrier spacing for the second New Radio band. The carrier aggregation configuration may include combinations of first supported channel bandwidths per sub-carrier spacing for the first New Radio band and second supported channel bandwidths per sub-carrier spacing for the second New Radio band.

The capability information may include (i) an indication of first supported channel bandwidths per sub-carrier spacing for the first New Radio band as a single band operation, and (ii) an indication of second supported channel bandwidths per sub-carrier spacing for the second New Radio band as a single band operation.

At least one other example embodiment provides a user equipment comprising at least one processor and at least one memory including computer program code. The at least one memory and the computer program code are configured to, with the at least one processor, cause the user equipment to: generate capability information including at least supported maximum channel bandwidth information and supported minimum channel bandwidth information per sub-carrier spacing for each band within a band combination; send the capability information to a radio access network element; and receive a carrier aggregation configuration from the radio access network element, the carrier aggregation configuration based on the capability information, and the carrier aggregation configuration configuring the user equipment for communication with the radio access network element.

At least one other example embodiment provides a user equipment comprising: means for generating capability information including at least supported maximum channel bandwidth information and supported minimum channel bandwidth information for each band within a band combination; means for sending the capability information to a radio access network element; and means for receiving a carrier aggregation configuration from the radio access network element, the carrier aggregation configuration based on the capability information, and the carrier aggregation configuration configuring a user equipment for communication with the radio access network element.

At least one other example embodiment provides a method comprising: generating capability information including at least supported maximum channel bandwidth information and supported minimum channel bandwidth information for each band within a band combination; sending the capability information to a radio access network element; and receiving a carrier aggregation configuration from the radio access network element, the carrier aggregation configuration based on the capability information, and the carrier aggregation configuration configuring a user equipment for communication with the radio access network element.

At least one other example embodiment provides a non-transitory computer readable medium storing computer readable instructions that, when executed by at least one processor at a user equipment, cause the user equipment to perform a method comprising: generating capability information including at least supported maximum channel bandwidth information and supported minimum channel bandwidth information for each band within a band combination; sending the capability information to a radio access network element; and receiving a carrier aggregation configuration from the radio access network element, the carrier aggregation configuration based on the capability information, and the carrier aggregation configuration configuring a user equipment for communication with the radio access network element.

The capability information may cause the radio access network element to generate the carrier aggregation configuration for the user equipment based on the capability information.

The supported maximum channel bandwidth information may include a supported maximum channel bandwidth per sub-carrier spacing for each band within the band combination.

The supported minimum channel bandwidth information may include a supported minimum channel bandwidth per sub-carrier spacing for each band within the band combination.

The user equipment may support a subset of all specified channel bandwidths per sub-carrier spacing for each band as a single band operation, and the capability information may include an indication of channel bandwidths in the subset of all specified channel bandwidths per sub-carrier spacing for each band as the single band operation.

The at least one memory and the computer program code may be configured to, with the at least one processor, cause the user equipment to generate the capability information in response to a capability inquiry from the radio access network element.

The capability information may include an indication that the capability information includes information for the radio access network to identify supported channel bandwidths for each band within the band combination.

The at least one memory and the computer program code may be configured to, with the at least one processor, cause the user equipment to send the capability information to the radio access network element via Radio Resource Control signaling.

The band combination may include at least a first New Radio band and a second New Radio band, the supported maximum channel bandwidth information includes (i) a first supported maximum channel bandwidth per sub-carrier spacing for the first New Radio band and (ii) a second supported maximum channel bandwidth per sub-carrier spacing for the second New Radio band, and the supported minimum channel bandwidth information includes (i) a first supported minimum channel bandwidth per sub-carrier spacing for the first New Radio band and (ii) a second supported minimum channel bandwidth per sub-carrier spacing for the second New Radio band. The carrier aggregation configuration may include combinations of first supported channel bandwidths per sub-carrier spacing for the first New Radio band and second supported channel bandwidths per sub-carrier spacing for the second New Radio band.

The capability information may include (i) an indication of first supported channel bandwidths per sub-carrier spacing for the first New Radio band as a single band operation, and (ii) an indication of second supported channel bandwidths per sub-carrier spacing for the second New Radio band as a single band operation.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

FIG. 4 illustrates an example of 3GPP Long-Term Evolution (3GPP-LTE) carrier aggregation (CA) bandwidth combination sets (BCSs) defined for inter-band CA (two bands).

FIG. 5 illustrates an example of 3GPP NR CA BCSs defined for inter-band CA (two bands).

FIG. 6 illustrates another example of 3GPP NR CA BCSs defined for inter-band CA (two-bands).

Figure 1:
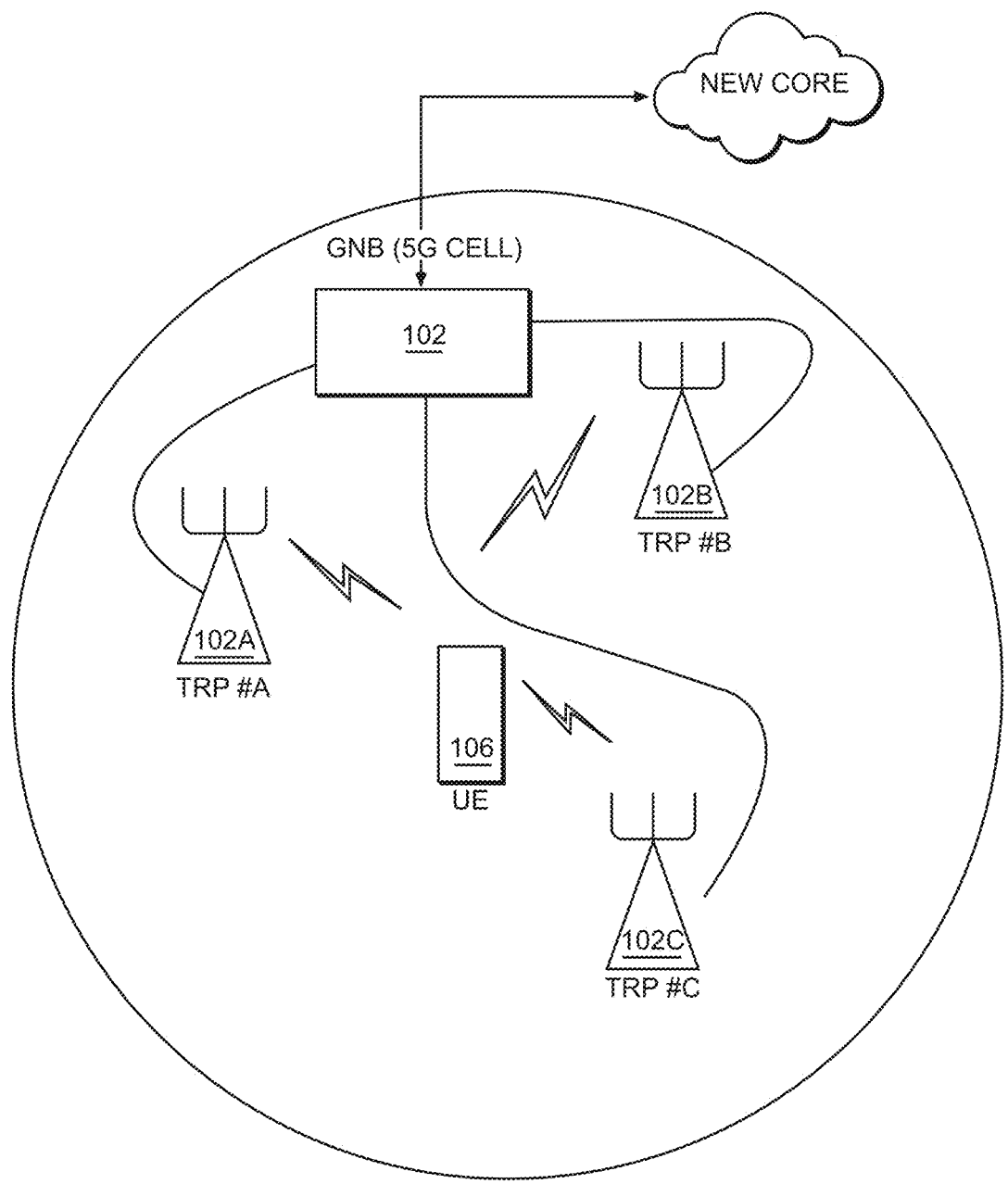
FIG. 1 illustrates a simplified diagram of a portion of a 3rd Generation Partnership Project (3GPP) New Radio (NR) access deployment for explaining example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of radio access network (RAN) or radio network elements (e.g., a gNB), user equipment (UE), or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a radio network element (or user equipment) to perform the operations discussed herein.

As discussed herein the terminology "one or more" and "at least one" may be used interchangeably.

As discussed herein, a gNB may also be referred to as a base station, access point, enhanced NodeB (eNodeB), or more generally, a radio access network element, radio network element, or network node. A UE may also be referred to herein as a mobile station, and may include a mobile phone, a cell phone, a smartphone, a handset, a personal digital assistant (PDA), a tablet, a laptop computer, a phablet, or the like.

It will be appreciated that a number of example embodiments may be used in combination.

3rd Generation Partnership Project (3GPP) Radio Access Network (RAN) Working Group 4 (WG4(RAN4)) has specified supported bandwidth combination sets (BCSs) for each 3GPP New Radio (NR) carrier aggregation (CA), multi-Radio Access Technology (multi-RAT) Dual Connectivity (MR-DC) and 3GPP Long Term Evolution (LTE) CA band combination. The virtue of a BCS is that a UE is allowed to support optimized (e.g., a minimum number of) channel bandwidth (CBW) combinations for a certain operator or region, which may lead to cost reduction due to smaller numbers of tests and InterOperability Development Testing (IoDT) efforts.

However, specifying one or more BCSs for each band combination may increase the complexity of the RAN4 specification and/or may require (e.g., significant) extra standardization work.

FIG. 4 illustrates an example of 3GPP-LTE CA BCSs defined for inter-band CA. The example shown in FIG. 4 includes LTE bands 4 and 12, and the maximum number of specified BCSs for one band combination is six.

FIG. 5 illustrates an example of 3GPP NR CA BCSs defined for inter-band CA. The example shown in FIG. 5 includes BCSs BCS0 and BCS1 for bands n28 and n75.

FIG. 6 illustrates another example of a 3GPP NR CA BCS defined for inter-band CA. More specifically, FIG. 6 illustrates an example of hypothetical BCS2 for bands n28 and n75.

In operation, a UE reports, to the base station, the supported BCS(s) for each band combination via a UE capability report. Conventionally, the base station stores all BCS(s) that it utilizes and supported CBW combinations for each band combination to interpret the reported UE capability, and ignores BCS(s) that are not utilized at the base station.

For 3GPP NR, the number of candidate CBWs is larger than the number of candidate CBWs for 3GPP LTE. Additionally, as shown in FIG. 5, supported CBWs per band for 3GPP NR is different from supported sub-carrier spacings (SCSs). As a result, 3GPP NR BCS tables are more complicated than 3GPP LTE BCS tables. In addition, unlike 3GPP LTE, for 3GPP NR, new CBW(s) can be added to existing bands, which may require introduction of new BCS(s). Thus, the number of BCS(s) for a NR band combination may be larger than that for the LTE band combination. From the perspective of gNB implementation, this situation may result in more frequent gNB updates to store the new BCS(s) than in 3GPP LTE networks.

Conventional methods may realize BCSs BCS0 and BCS1 in FIG. 5. However, conventional methods cannot solve the case in which the minimum CBWs are limited to (e.g., only) some of the 3GPP NR bands in a BCS such as that shown in FIG. 6 because, for example, support for 5, 10 and 15 MHz CBWs is mandatory for single band operation in principle. Though it is possible not to support 5, 10 and 15 MHz CBW for each band in a band combination by not supporting these CBWs as single band operation in terms of signaling, doing so results in these CBWs being unavailable even when CA is not necessary (e.g., in single band operation), or leads to the situation in which the UE may not be usable across different networks worldwide.

One or more example embodiments introduce a signaling mechanism in which a UE may report a range of supported CBWs per SCS for each NR band within a band combination. In at least one example embodiment, the UE may report a supported minimum CBW per SCS for each NR band within the band combination and a supported maximum CBW per SCS for each NR band within the band combination. One or more example embodiments also provide a mechanism for the UE to indicate support for example embodiments discussed herein by sending a fixed BCS number such as BCS "x" (e.g., x=4), common to any or all band combinations, to the gNB.

In more detail, one or more example embodiments provide mechanisms for a UE to report the following parameters to the gNB via, for example, Radio Resource Control (RRC) signaling:

(i) supported CBW(s) per SCS for each NR band as a single band operation (if any), (ii) supported maximum CBW per SCS for each NR band within a band combination, and (iii) supported minimum CBW per SCS for each NR band within the band combination.

The gNB identifies, for the UE, supported CBW(s) per SCS for each NR band within the band combination based on at least parameters (ii) and (iii) discussed above. The supported CBW combinations include permutations of each of the supported CBW per SCS per NR band.

According to one or more example embodiments, a BCS (e.g., BCS2) in NR may be realized without explicitly adding a new BCS and reporting the supported CBW(s) per SCS for each NR band as a single band operation. Thus, from the perspective of the UE, (e.g., optimized) CBW combination selection may be possible for reducing costs. From the perspective of the gNB, the gNB need not memorize (e.g., store) the definition of each BCS as in the conventional art. Rather, the gNB may determine supported CBW combinations for a UE for a given band combination based on reported capabilities from the UE. Capability reporting and, more generally, signaling between the UE and the gNB according to one or more example embodiments, will be discussed in more detail later.

FIG. 1 illustrates a simplified diagram of a portion of a 3GPP NR access deployment for explaining example embodiments in more detail.

Referring to FIG. 1, the 3GPP NR radio access deployment includes a gNB 102 having transmission and reception points (TRPs) 102A, 102B, 102C. Each TRP 102A, 102B, 102C may be, for example, a remote radio head (RRH) or remote radio unit (RRU) including at least, for example, a radio frequency (RF) antenna (or antennas) or antenna panels, and a radio transceiver, for transmitting and receiving data within a geographical area. In this regard, the TRPs 102A, 102B, 102C provide cellular resources for user equipment (UEs) (e.g., UE 106) within a geographical coverage area. In some cases, baseband processing may be divided between the TRPs 102A, 102B, 102C and gNB 102 in a 5th Generation (5G) cell. Alternatively, the baseband processing may be performed at the gNB 102. In the example shown in FIG. 1, the TRPs 102A, 102B, 102C are configured to communicate with UE 106 via one or more transmit (TX)/receive (RX) beam pairs. The gNB 102 communicates with the core network, which is referred to as the New Core in 3GPP NR.

The TRPs 102A, 102B, 102C may have independent schedulers, or the gNB 102 may perform joint scheduling among the TRPs 102A, 102B, 102C.

Although only a single UE 106 is shown in FIG. 1, the gNB 102 and TRPs 102A, 102B, 102C may provide communication services to a relatively large number of UEs within the coverage area of the TRPs 102A, 102B, 102C. For the sake of clarity of example embodiments, communication services (including transmitting and receiving wireless signals) will be discussed as between the gNB 102 and the UE 106. It should be understood, however, that signals may be transmitted between the UE 106 and one or more of the TRPs 102A, 102B, 102C.

Example functionality and operation of the gNB 102 and the UE 106 in the context of RRC signaling will be discussed in more detail below. Because RRC signaling is generally known, a detailed discussion will not be provided. Moreover, although example embodiments are discussed herein with regard to RRC signaling, example embodiments should not be limited to this example. Rather, other signaling mechanisms may be used.

Figure 2:
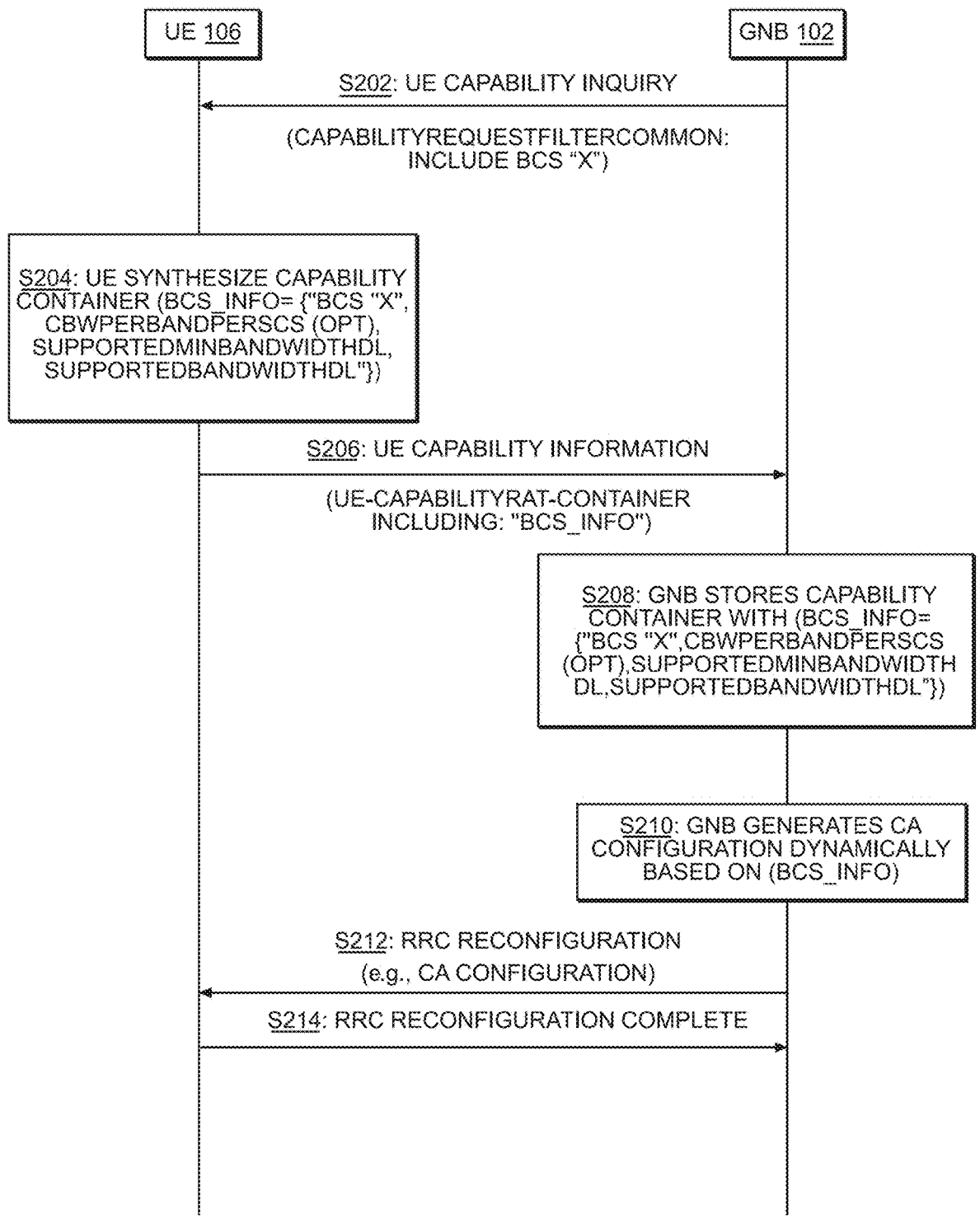
FIG. 2 is a signal flow diagram illustrating a method according to example embodiments.

FIG. 2 is a signal flow diagram illustrating a method according to example embodiments.

Referring to FIG. 2, at S202 the gNB 102 sends a UE capability inquiry (also sometimes referred to herein as a UE capability request) to the UE 106 requesting capability information from the UE 106. In at least one example, the UE capability inquiry may include a request that the UE 106 report, among other things, BCS "x" (also referred to as BCSx) by including a given bit (or set of bits) in a capability filter (e.g., sent via RRC signaling to the gNB 102). The request may be, for example, capabilityRequestFilterCommon: Include BCS "x". BCS "x" or BCSx may be a fixed BCS number such x=4, which is common to any band combinations and may be used to inform the gNB 102 that the UE 106 supports one or more example embodiments described herein.

Assuming the UE 106 supports the mechanisms discussed herein, at S204, the UE 106 synthesizes the capability container (ue-CapabilityRAT-Container) based on the request to report BCS "x", and generates BCS information BCS_Info for the UE 106. In at least one example, the BCS information BCS_Info includes the following parameters for each SCS:

CBWperBandperSCS: Supported CBW(s) for each NR band as a single band operation (this parameter may be optional depending on whether there are any CBWs meeting this condition);

supportedBandwidthDL: Supported maximum CBW for each NR band within a band combination; and supportedMinBandwidthDL: Supported minimum CBW for each NR band within the band combination.

The parameters mentioned above may be known (or, alternatively, (pre)programmed) at the UE and/or based on the capabilities of the UE 106. Moreover, the BCS information BCS_Info may be formatted according to the ASN.1 notation used in the RRC specification. Because such a format is known, a detailed discussion is omitted.

Still referring to FIG. 2, at S206, the UE 106 sends the BCS information BCS_Info to the gNB 102. In at least one example, the UE 106 sends the BCS information BCS_Info to the gNB 102 in a UE Capability Information RRC message. In one example, the UE Capability Information RRC message includes the capability container ue-CapabilityRAT-Container, which further includes the BCS information BCS_Info. The capability container CapabilityRAT- Container is listed in the capability container list UE-CapabilityRAT-ContainerList.

At S208, the gNB 102 receives the BCS information BCS_Info from the UE 106 (e.g., included in the UE Capability Information RRC message), and records/stores the BCS information BCS_Info in a memory at the gNB 102.

At S210, the gNB 102 dynamically generates a CA configuration for the UE 106 based on the BCS information BCS_Info. The CA configuration may include supported one or more CBW(s) per SCS combination(s) for the identified band combination(s). In more detail, for example, at S210, the gNB 102 identifies, for each NR band within a given band combination, (i) the CBW(s) supported by the UE for each NR band as a single band operation, and (ii) the range of CBW(s) between the supported maximum CBW and the supported minimum CBW included in the BCS information BCS_Info from the UE 106. The gNB 102 then determines or identifies combinations of each of the supported CBW(s) per NR band as the supported CBW(s) per SCS combination(s) for the band combination(s). In one example, the combinations include all permutations of the supported CBWs per NR band. A more specific example of combinations of the supported CBW(s) per band will be discussed later.

According to one or more example embodiments, the gNB 102 need not store any tables associated with BCS(s) to generate CA configuration for the UE 106. Rather, the gNB 102 need only store the BCS information BCS_Info to generate the CA configuration on the fly (at runtime).

Still referring to FIG. 2, after having generated the CA configuration for the UE 106, the gNB 102 and the UE 106 exchange RRC (re)configuration messages at S212 and S214. Because RRC (re)configuration messages and exchange thereof between a gNB and a UE are generally known, only a brief discussion is provided below.

In more detail, at S212, the gNB 102 sends a RRC (re)configuration message including the determined CA configuration to the UE 106.

In response to the RRC (re)configuration message, the UE 106 performs CA configuration (not shown). Once complete, at S214 the UE 106 sends a RRC reconfiguration complete message to the gNB 102 indicating the same.

The UE 106 may then communicate with the gNB 102 on the downlink using the CA configuration provided by the gNB 102.

The UE 106 may explicitly report the CBW(s) supported at the UE 106 if there are any CBW(s) not supported for a given NR band. That is, for example, where the UE 106 supports a subset of all specified channel bandwidths per sub-carrier spacing for each band as a single band operation, the UE 106 may provide an explicit indication of the channel bandwidths in the subset of all specified channel bandwidths per sub-carrier spacing for each band as the single band operation.

From the perspective of the RAN2 specification, however, if all the specified CBWs among 5, 10, 15, 20, 25, 30, 40, 50, 60, 80 and 100 MHz for a NR band between 410 MHz and 7125 MHz or 50, 100 and 200 MHz for a band between 24250 MHz-52600 MHz are supported by the UE, the UE 106 need not explicitly report these CBWs to the gNB 102 in practice.

Although discussed with regard to downlink communications, example embodiments should not be limited to this example. Rather, example embodiments may also be applicable to uplink communications.

A more specific example in which SCS=15 kHz and the band combination includes NR bands n28 and n75 is described below. It should be understood, however, that example embodiments should not be limited to this example. This example will be discussed with reference to the signal flow diagram in FIG. 2 (where applicable) and the gNB 102 and the UE 106 shown in FIG. 1.

In this example, the UE 106 may explicitly report supported CBW(s) (e.g., 5, 10, 15, 20 and 30 MHz for NR band n28 and 5, 10, 15, 20, 25, 30, 40 and 50 MHz for NR band n75). As noted above, however, the support of these CBWs is mandatory so that the UE 106 need not explicitly report these CBWs to the gNB 102.

In response to the UE capability inquiry (S202), at S206 the UE 106 reports at least the supported maximum CBW for each NR band within a band combination with a single band entry and a single component carrier (CC) entry via the supported maximum CBW parameter supportedBandwidthDL such that supported maximum CBW parameter supportedBandwidthDL for NR band n28 is 20 MHz and the supported maximum CBW parameter supportedBandwidthDL for NR band n75 is 40 MHz. Also at S206, the UE 106 reports the supported minimum CBW for each NR band within a band combination with a single band entry and a single CC entry via the supported minimum CBW parameter supportedMinBandwidthDL such that the supported minimum CBW parameter supportedMinBandwidthDL for NR band n28 is 10 MHz and the supported minimum CBW parameter supportedMinBandwidthDL for NR band n75 is 20 MHz. The UE 106 may also include (i) an indication of first supported channel bandwidths per sub-carrier spacing for the NR band n28 (first New Radio band) as a single band operation, and (ii) an indication of second supported channel bandwidths per sub-carrier spacing for the NR band n75 (second New Radio band) as a single band operation.

After storing the reported capability information from the UE 106 (S208), at S210 the gNB 102 determines that the supported CBWs for the band combination are in the range between 10 MHz and 20 MHz (10 MHz CBW 20 MHz) for NR band n28. Thus, in this example, the gNB 102 determines that 10, 15 and 20 MHz bands are supported by the UE 106 for NR band n28. For NR band n75, the gNB 102 determines that, given the reported information, the supported CBWs for the band combination are between 20 MHz and 40 MHz (20 MHz CBW 40 MHz). Thus, the gNB 102 determines that 20, 25, 30 and 40 MHz bands are supported for NR band n75.

Accordingly, in this example, the gNB 102 determines that supported CBW(s) combinations for the band combination are the combinations of each of the supported CBWs per NR band derived above. That is, in this example, for SCS=15 kHz, the supported CBW combinations are (n28, n75)=(10, 20), (10, 25), (10, 30), (10, 40), (15, 20), (15, 25), . . . , (20, 40). Thus, in this example, unsupported CBW combinations (n28, n75)=(5, 5), (5, 10), (5, 15) may be omitted with relatively simple (simpler) signaling.

Figure 3:
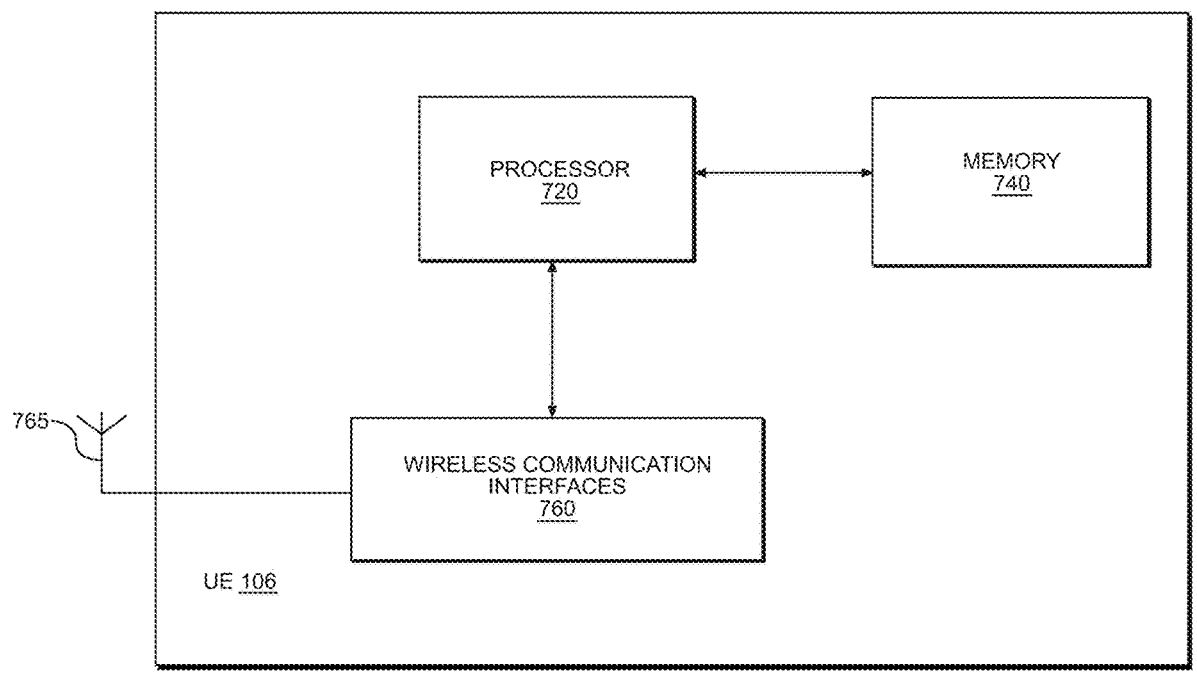
FIG. 3 is a block diagram illustrating an example embodiment of a UE.

FIG. 3 illustrates an example embodiment of the UE 106 shown in FIG. 1.

As shown, the UE 106 includes: a memory 740; a processor 720 connected to the memory 740; various interfaces 760 connected to the processor 720; and one or more (e.g., a plurality of) antennas or antenna panels 765 connected to the various interfaces 760. The various interfaces 760 and the antenna 765 may constitute a transceiver for transmitting/receiving data from/to the gNB 102 via one or more wireless beams or from/to the plurality of TRPs 102A, 102B, 102C, etc. As will be appreciated, depending on the implementation of the UE 106, the UE 106 may include many more components than those shown in FIG. 3. However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the UE 106 (e.g., functionalities of a UE, methods according to the example embodiments, etc.) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the antenna 765, or other input/output components. As will be understood, the various interfaces 760 and programs stored in the memory 740 to set forth the special purpose functionalities of the UE 106 will vary depending on the implementation of the UE 106.

The interfaces 760 may also include one or more user input devices (e.g., a keyboard, a keypad, a mouse, or the like) and user output devices (e.g., a display, a speaker, or the like).

Although not specifically discussed herein, the configuration shown in FIG. 3 may be utilized to implement, inter alia, the TRPs 102A, 102B, 102C, the gNB 102, other radio access and backhaul network elements and/or devices. In this regard, for example, the memory 740 may store an operating system and any other routines/modules/applications for providing the functionalities of the TRPs, gNB, etc. (e.g., functionalities of these elements, methods according to the example embodiments, etc.) to be executed by the processor 720.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, eNBs, RRHs, gNBs, femto base stations, network controllers, computers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, sub-routine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A radio access network element comprising:
   at least one processor; and
   at least one memory including computer program code, the at least one memory and the computer program code configured to, with the at least one processor, cause the radio access network element to
   generate a carrier aggregation configuration for a user equipment based on capability information from the user equipment, the capability information including at least supported maximum channel bandwidth information and supported minimum channel bandwidth information for each band within a band combination; and
   send the carrier aggregation configuration to the user equipment to configure the user equipment for communication with the radio access network element.

2. The radio access network element of claim 1, wherein the at least one memory and the computer program code are configured to, with the at least one processor, cause the radio access network element to generate the carrier aggregation configuration without storing definitions of each bandwidth combination set supported by the user equipment.

3. The radio access network element of claim 1, wherein the supported maximum channel bandwidth information includes a supported maximum channel bandwidth per sub-carrier spacing for each band within the band combination.

4. The radio access network element of claim 1, wherein the supported minimum channel bandwidth information includes a supported minimum channel bandwidth per sub-carrier spacing for each band within the band combination.

5. The radio access network element of claim 1, wherein
   the user equipment supports a subset of all specified channel bandwidths per sub-carrier spacing for each band as a single band operation, and
   the capability information includes an indication of channel bandwidths in the subset of all specified channel bandwidths per sub-carrier spacing for each band as the single band operation.

6. The radio access network element of claim 1, wherein the at least one memory and the computer program code are configured to, with the at least one processor, cause the radio access network element to send a capability inquiry requesting the capability information from the user equipment.

7. The radio access network element of claim 1, wherein the capability information includes an indication that the capability information includes information to identify supported channel bandwidths for each band within the band combination.

8. The radio access network element of claim 1, wherein the at least one memory and the computer program code are configured to, with the at least one processor, cause the radio access network element to send the carrier aggregation configuration to the user equipment as a Radio Resource Control message.

9. The radio access network element of claim 1, wherein the band combination includes at least a first New Radio band and a second New Radio band, the supported maximum channel bandwidth information includes (i) a first supported maximum channel bandwidth per sub-carrier spacing for the first New Radio band and (ii) a second supported maximum channel bandwidth per sub-carrier spacing for the second New Radio band, the supported minimum channel bandwidth information includes (i) a first supported minimum channel bandwidth per sub-carrier spacing for the first New Radio band and (ii) a second supported minimum channel bandwidth per sub-carrier spacing for the second New Radio band, and the carrier aggregation configuration includes combinations of first supported channel bandwidths per sub-carrier spacing for the first New Radio band and second supported channel bandwidths per sub-carrier spacing for the second New Radio band.

10. The radio access network element of claim 9, wherein the capability information includes (i) an indication of first supported channel bandwidths per sub-carrier spacing for the first New Radio band as a single band operation, and (ii) an indication of second supported channel bandwidths per sub-carrier spacing for the second New Radio band as a single band operation.

11. A method comprising:
generating a carrier aggregation configuration for a user equipment based on capability information from the user equipment, the capability information including at least supported maximum channel bandwidth information and supported minimum channel bandwidth information per sub-carrier spacing for each band within a band combination; and
sending the carrier aggregation configuration to the user equipment to configure the user equipment for communication with a radio access network element.

12. The radio access network element of claim 1, wherein the supported minimum channel bandwidth information includes a supported minimum channel bandwidth per component carrier for each band within the band combination.

13. A user equipment comprising:
at least one processor; and
at least one memory including computer program code, the at least one memory and the computer program code configured to, with the at least one processor, cause the user equipment to
generate capability information including at least supported maximum channel bandwidth information and supported minimum channel bandwidth information per sub-carrier spacing for each band within a band combination,
send the capability information to a radio access network element, and
receive a carrier aggregation configuration from the radio access network element, the carrier aggregation configuration based on the capability information, and the carrier aggregation configuration configuring the user equipment for communication with the radio access network element.

14. The user equipment of claim 13, wherein the capability information causes the radio access network element to generate the carrier aggregation configuration for the user equipment based on the capability information.

15. The user equipment of claim 13, wherein the supported maximum channel bandwidth information includes a supported maximum channel bandwidth per sub-carrier spacing for each band within the band combination.

16. The user equipment of claim 13, wherein the supported minimum channel bandwidth information includes a supported minimum channel bandwidth per sub-carrier spacing for each band within the band combination.

17. The user equipment of claim 13, wherein
the user equipment supports a subset of all specified channel bandwidths per sub-carrier spacing for each band as a single band operation, and
the capability information includes an indication of channel bandwidths in the subset of all specified channel bandwidths per sub-carrier spacing for each band as the single band operation.

18. The user equipment of claim 13, wherein the at least one memory and the computer program code are configured to, with the at least one processor, cause the user equipment to generate the capability information in response to a capability inquiry from the radio access network element.

19. The user equipment of claim 13, wherein the capability information includes an indication that the capability information includes information for the radio access network element to identify supported channel bandwidths for each band within the band combination.

20. The user equipment of claim 13, wherein the at least one memory and the computer program code are configured to, with the at least one processor, cause the user equipment to send the capability information to the radio access network element via Radio Resource Control signaling.

21. The user equipment of claim 13, wherein
the band combination includes at least a first New Radio band and a second New Radio band,
the supported maximum channel bandwidth information includes (i) a first supported maximum channel bandwidth per sub-carrier spacing for the first New Radio band and (ii) a second supported maximum channel bandwidth per sub-carrier spacing for the second New Radio band,
the supported minimum channel bandwidth information includes (i) a first supported minimum channel bandwidth per sub-carrier spacing for the first New Radio band and (ii) a second supported minimum channel bandwidth per sub-carrier spacing for the second New Radio band, and
the carrier aggregation configuration includes combinations of first supported channel bandwidths per sub-carrier spacing for the first New Radio band and second supported channel bandwidths per sub-carrier spacing for the second New Radio band.

22. The user equipment of claim 21, wherein the capability information includes (i) an indication of first supported channel bandwidths per sub-carrier spacing for the first New Radio band as a single band operation, and (ii) an indication of second supported channel bandwidths per sub-carrier spacing for the second New Radio band as a single band operation.

23. The user equipment of claim 13, wherein the supported minimum channel bandwidth information includes a supported minimum channel bandwidth per component carrier for each band within the band combination.

24. A method comprising:
generating capability information including at least supported maximum channel bandwidth information and supported minimum channel bandwidth information for each band within a band combination;
sending the capability information to a radio access network element; and
receiving a carrier aggregation configuration from the radio access network element, the carrier aggregation configuration based on the capability information, and the carrier aggregation configuration configuring a user equipment for communication with the radio access network element.

* * * * *